Nov. 13, 1951 H. I. STANBACK ET AL 2,574,939
WELDER CONTROL SYSTEM
Filed March 8, 1949 2 SHEETS—SHEET 1
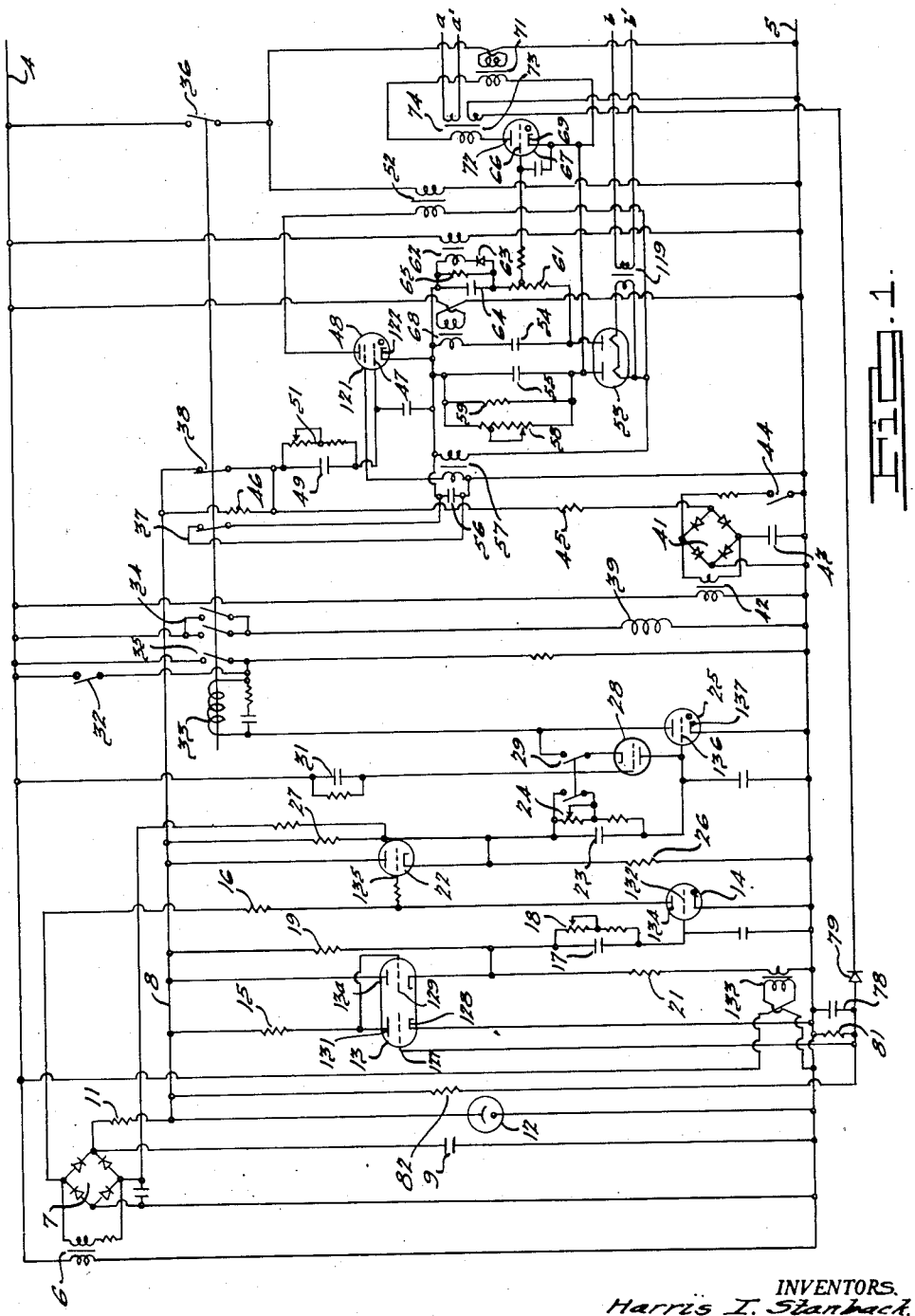
INVENTORS.
Harris I. Stanback,
Ernest G. Anger.
BY
Myron J. Seibold
ATTORNEY.

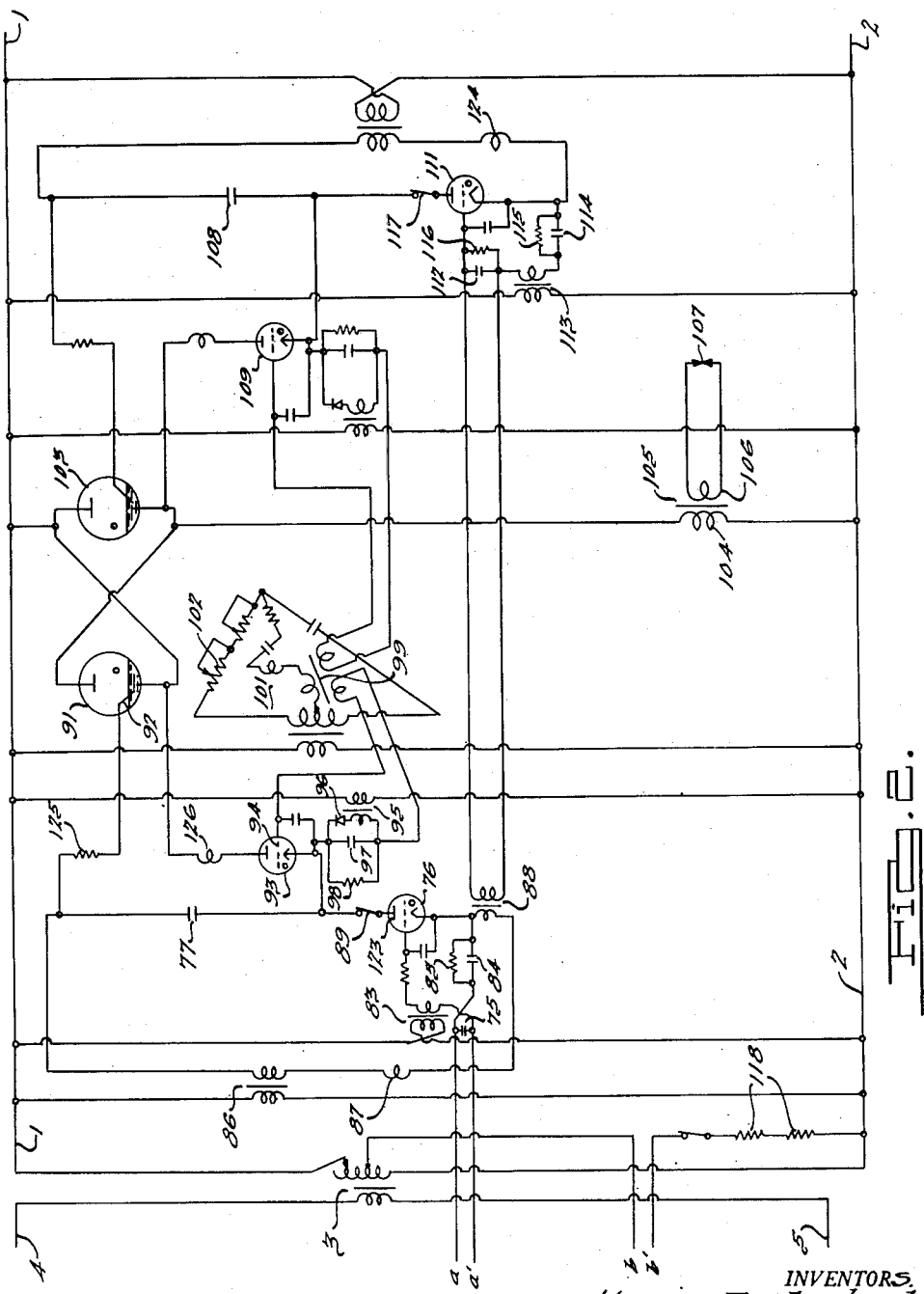

Patented Nov. 13, 1951

2,574,939

UNITED STATES PATENT OFFICE 2,574,939

WELDER CONTROL SYSTEM

Harris I. Stanback, Milwaukee, and Ernest G. Anger, Wauwatosa, Wis., assignors to Square D Company, Detroit, Mich., a corporation of Michigan Application March 8, 1949, Serial No. 80,118

18 Claims. (Cl. 219—4)

1

This invention relates to a control system for electric welding and has for its object the provision of an improved form of such control system which is fully electronic in operation except for the initially operated control switch.

Another object of the invention is the provision of an electric control system having improved system arrangements for the determination of "squeeze," "weld," "hold" and "off" times which constitute improvements in the art both individually and in combination, each with any one or all of the others.

Another object of the invention is the provision of an electric welder control system in accordance with the preceding object in which the initiation and termination of the timing periods is determined electronically without the interposition of intermediate control relays.

Other objects and features of the invention will be readily apparent to those skilled in the art from the specification and appended drawings illustrating certain preferred embodiments in which:

Figures 1 and 2 combined form a schematic wiring diagram of the electric welder control system according to the present invention.

The charging arrangement for the firing capacitors of the discharge tubes is described and claimed in a copending application of Ernest G. Anger entitled Firing of Electric Discharge Tubes filed March 2, 1949, Serial No. 79,149, now abandoned.

Certain circuit arrangements preventing the build-up of dangerously high voltages in the standby condition are described and claimed in applicants' copending application entitled Firing System for Electric Discharge Tubes filed March 2, 1949, Serial No. 79,214, now U. S. Patent 2,520,478 granted August 29, 1950.

The system arrangement to secure proper lead-trail tube characteristic and the polarizing of the initial weld current is described and claimed in applicants' copending application entitled Lead Trail Control System for Electric Discharge Tubes filed March 2, 1949, Serial No. 79,212, now U. S. Patent 2,520,477 granted August 29, 1950.

The safety feature of the system in the connection of the heater coils for the thermal flow switches is described and claimed in a copending application of Harris I. Stanback entitled Overheating Safety System for Electric Discharge Tubes and filed March 2, 1949, Serial No. 79,211, now U. S. Patent 2,520,476 granted August 29, 1950.

The timing control for the weld time is described and claimed in applicants' copending application entitled Electrical Timing Control filed March 2, 1949, Serial No. 79,213, now U. S. Patent 2,534,385 granted December 19, 1950.

In the system as illustrated in the diagram, the mains 1 and 2 of Figure 2 are connected to a source of alternating voltage and serve to supply power to the load and controlling circuits. A voltage reducing transformer 3 supplies the control lines 4, 5. Transformer 6 of Figure 1, whose primary is energized across the lines 4 and 5, provides energy to a full wave rectifier bridge 7 the output of which supplies a D. C. potential across the lines 8 and 5. A capacitor 9, resistor 11 and a voltage regulator tube 12 aid in maintaining a constant D. C. potential.

The rectifier bridge 7 supplies the duplex valve 13, 13a and valve 14. In the anode circuit of valve 13 is a voltage determining resistor 15; in the anode circuit of valve 14 is a loading resistor 16. In the grid circuit of the valve 14 is a capacitor 17 and a parallel adjustable resistor combination 18 connected to the lines 3 and 5 through the voltage determining resistors 19 and 21. Also across the lines 8 and 5 is an electric valve 22 through which is charged a capacitor 23, bridged by an adjustable resistor combination 24, the capacitor connected in the grid circuit of an electric valve 25, and to the lines 8 and 5 through voltage determining resistors 26 and 27. Also in the grid circuit of electric valve 25 is an electric valve 28, the conduction of which, upon closure of a repeat-nonrepeat switch 29, serves to charge the capacitor 23 when the valve 25 is nonconducting. A capacitor 31 is provided in the grid circuit of the electric valve 28 to insure that the valve 28 will not conduct immediately upon closure of an initiating switch 32, which would prevent the conduction of valve 25. In the circuit of valve 25 through switch 32 is connected a relay energizing coil 33 which serves to close the contacts 34, 35 and 36 and open the contacts 37 and 38. A valve solenoid 39 is connected to be energized when the contact 34 closes.

A bridge rectifier indicated at 41 is supplied by a transformer 42, the primary of which is energized across the supply lines 4 and 5. A capacitor 43 and pressure switch 44 are associated with the bridge rectifier 41 and together with the voltage dividing resistors 45 and 46 serve to affect the potential at the control grid 47 of an electric valve 48. Also affecting the potential at the control grid 47 of the electric valve 48 is a capacitor 49 and a parallel adjustable resistor combination 51. A transformer 52, whose primary is energized from the supply lines 4 and 5 after the contact 36 closes, serves to provide potential to the anode and cathode of the electric valve 48 through a rectifier valve 53 and timing capacitors 54 and 55. Connected to the cathode of the electric valve 48 is a capacitor 56 connected so as to be charged from a transformer 57 upon conduction of the electric valve 48. Adjustable resistor combinations 58 and 59 bridge the timing capacitor 55 while a tapped resistor 61 and a biasing circuit, consisting of a transformer 62 energized from the supply lines, a rectifier 63, a capacitor 64 and a resistor 65, for the grid 66 of valve 67, are connected across the timing capacitor 54. In series with the timing capacitor 54 is the secondary of a synchronizing transformer 68 energized from the supply lines 4 and 5. At the tap to the resistor 61 is connected the control grid 66 of an electric valve 67, the cathode 69 of which is connected to the negative side of capacitor 55.

A transformer 71 has its primary connected to the supply across lines 4 and 5 through contact 36 and its secondary output fed to the anode 72 and cathode 69 of the electric valve 67 through the primary of transformers 73 and 74. The secondary of the transformer 74 is connected across the capacitor 75 (see Figure 2) connected in the circuit of the grid of electric valve 76 which controls the charging of the firing capacitor 77.

The secondary of the transformer 73 is connected across a capacitor 78 through a rectifier 79, the capacitor bridged by a resistor 81 and connected in the grid circuit of valve 13. The capacitor 78 and resistor 81 are also connected between the lines 5 and 8 through a resistor 82.

A transformer 83 has its primary energized from the mains 1 and 2 and its secondary connected in the control grid circuit of valve 76 in series with the capacitor 75 and a capacitor 84 which is bypassed by a resistor 85. The anode and cathode of the valve 76 are connected across the secondary output of a transformer 86 in series with a firing capacitor 77, and with the reactor 87 tuned for series resonance with the firing capacitor 77. The primary of transformer 86 is energized from the mains 1 and 2. Also in series with the circuit of the valve 76 are the primary of a transformer 88 and the contacts 89 of a thermal flow switch for the electric discharge tubes 91 and 103. Across the firing capacitor 77, which discharges therethrough, is connected the igniter 92 of electric discharge tube 91 through an electric valve 93. Valve 93 has its grid 94 connected to a hold-off bias circuit comprising the secondary of transformer 95, a rectifier 96, and a capacitor 97 bypassed by resistor 98, the primary of transformer 95 being connected across mains 1 and 2. Also in the circuit of grid 94 is a secondary of peaking transformer 99, the primary of which is connected with an adjustable resistance—capacitance phase shifting network indicated generally at 101, the resistance 102 being adjustable to vary the phase angle of the secondary voltage of the transformer 99.

Connected back to back with the electric discharge tube 91 is a second tube 103, these discharge tubes serving to pass both half cycles of main supply current through the load represented by the primary 104 of a welding transformer 105, the secondary 106 supplying a welding load at 107. Electric discharge tube 103 is fired by components similar to those set forth with respect to tube 91, these constituting the firing capacitor 108, the discharge valve 109 and charging valve 111.

To secure proper firing of the charging valve 111, the secondary output of transformer 88 is fed across a capacitor 112 in the grid circuit of valve 111, in series with the elements supplying the hold-off bias and constituted by the secondary transformer 113 and the capacitor 114 bypassed by resistor 115. The capacitor 112 is bypassed by a discharge resistor 116. In series with the firing capacitor 108 and the valve 111 are the contacts 117 of the thermal flow switch for the discharge tubes and the reactor 124 in series resonance with firing capacitor 108.

The heaters for the thermal flow switches, whose contacts are shown at 89 and 117 are shown at 118 connected in series with each other and through the primary of transformer 119 to a tap-off point of a transformer 3 connected across mains 1 and 2. The secondary output of transformer 119 is fed through the cathode heaters or filaments of the rectifier tube 53.

The operation of the system is as follows:

Closure of initiating switch 32 serves to connect across the lines 4 and 5, the electric valve 25 which conducts to energize relay coil 33, which causes, first, the normally closed contact 38 to open, thereby effectively disconnecting control grid 47 of valve 48 from the positive D. C. voltage supplied by rectifier bridge 7. The energized relay 33 then closes the switch 34 which energizes the valve solenoid 39 on the welder; opens the switch 37 which removes the short circuit across capacitor 56; closes the switch 35 which forms a non-beat holding circuit in parallel with the initiating switch; and closes the switch 36 which energizes supply transformers 71 and 52.

Before contact 38 was opened, capacitor 49 was charged by control grid conduction of valve 48 to the positive value of the D. C. voltage provided by the rectifier bridge 7. When the contact 38 is opened, the supply of positive D. C. voltage is no longer directly in contact with capacitor 49 and the control grid 47 of valve 48 assumes a negative potential, the value of which is determined by the voltage supply transformer 42, rectifier bridge 41, capacitor 43, and voltage divider resistors 45, 46. While pressure switch 44 is open, this grid potential is always sufficiently negative to prevent the conduction of valve 48.

When the pressure switch 44 closes, however, the charge on capacitor 43 is so dissipated that the grid 47 of valve 48 is permitted to become sufficiently positive at the beginning of each positive half cycle so that valve 48 conducts, providing the previously mentioned charge on capacitor 49 has been dissipated through the adjustable bleeder resistor combination 51. Conduction of valve 48 will not occur, regardless of closing of pressure switch 44, until the charge on capacitor 49 has been dissipated. The duration of this charge will be determined by the setting of bleeder resistor 51 whose adjustment therefor determines the timing interval of the "squeeze" time in the welding sequence. When valve 48 conducts, it passes current which charges the weld time capacitors 54 and 55 from transformer 52 through rectifier tube 53. The conduction current of valve 48 also energizes transformer 57, the secondary of which serves to charge capacitor 56 by screen grid 121 conduction of valve 48. The charge built up on this capacitor is of such nature as to cause the potential of the cathode 122 of valve 48 to become substantially positive with respect to the control grid 47 of that valve. This charge will prevent the conduction of valve 48 for any period in excess of a single half cycle at the beginning of each system operation, each charge remaining upon the capacitor 56 until relay coil 33 is deenergized and contact 37 closed to remove the charge of the capacitor 56.

While valve 48 is conducting, the timing capacitors 54 and 55 are charged simultaneously to the same voltage and are then effectively disconnected from the charging transformer 52 when valve 48 ceases to conduct. The tap-off point on resistor 61 is connected to the grid 66 of valve 67. This tap is so disposed as to place the grid 66 at approximately one-third the negative potential of capacitor 54. The cathode 69, meanwhile, is electrically connected to capacitor 55 and is at the full negative potential of that capacitor. The grid 66 is therefore substantially positive with respect to the cathode 69 and sufficiently so as to effect conduction of valve 67 during those half cycles during which the anode 72 of the valve 67 is positive with respect to cathode 69 thereof. Capacitor 54 discharges very slowly through resistor 61; capacitor 55, however, discharges more rapidly through adjustable resistor combination 58 and 59. In effect, therefore, the potential of cathode 69 approaches that of grid 66, due to the more rapid discharge of capacitor 55, until the potentials of the cathode and grid are substantially equal. After such time, valve 67 will not conduct. It may readily be seen that the "weld" time or the number of half cycles during which valve 67 will conduct, is independent of the value of the voltage to which capacitors 54 and 55 are charged, the weld time or number of conductive periods being dependent only upon the time of discharge of said capacitors, the time required for the cathode voltage to equal the grid voltage being always the same for any particular setting of the discharge resistors.

The secondary of transformer 68 is connected in series with capacitor 54 in order to help synchronize the timing action with the power supply voltage wave, while capacitor 64, resistor 65, transformer 62 and rectifier 63 serve to provide a hold-off bias for the grid 66 of valve 67.

During weld time, the current conducted by valve 67 energizes transformer 74. The secondary of that transformer charges capacitor 75. The charge on capacitor 75 is oscillatory in form and during the next half cycle when the anode 123 of valve 76 becomes positive, the charge on capacitor 75 is positive at the grid end. The hold-off bias is thereby overcome to effect the conduction of that valve.

The current which valve 76 conducts energizes transformer 88 and charges firing capacitor 77 through inductive reactor 87 which is tuned for series resonance with the capacitor 77, the resonant condition serving to charge the firing capacitor 77 to a voltage substantially greater than that of the output of charging transformer 86. Moreover, the inductive reactor 87 tends to limit abnormal current values in the valve 76 circuit to safe magnitudes.

The energization of transformer 88 by the conduction current of valve 76 causes the secondary of transformer 88 to supply a charge to capacitor 112. The charge is placed upon the capacitor 112 during the half cycle in which valve 76 conducts, this charge causing valve 111 to conduct during the following half cycle, the conduction of the valve 111 serving to charge firing capacitor 108 through the reactor 124 tuned to series resonance therewith, as previously described for the interaction of capacitor 77 and reactor 87.

During the half cycle following that of the conduction of valve 76, a voltage is supplied to the grid 94 of valve 93 by a secondary of peaking transformer 99, the voltage peak occurring in an adjustable and predetermined position in each half cycle. This selection is accomplished by the capacitance-resistance bridge combination indicated generally at 101 and the adjustment of resistor 102 thereof. This pulse of grid voltage overcomes the hold-off bias, supplied to the grid 94 by the charge on capacitor 97 supplied by transformer 95, and causes valve 93 to conduct, the conduction of this valve serving to rapidly discharge firing capacitor 77 through the resistor 125, inductive reactor 126, and the igniter 92 of electric discharge tube 91 and the mercury pool cathode thereof. The resistance 102 is adjusted to vary the phase angle of the voltage supplied by a secondary of peaking transformer 99 to the control grid of valve 93 (and by another secondary of the same transformer to the control grid of valve 109). The particular point on the voltage wave at which the peak of positive voltage is supplied from transformer 99 to the control grid of valve 93 (and to the control grid of valve 109) determines the length of time during which current can be passed by the associated electric discharge tube; or, in other terms, the phase angle of the positive voltage supplied by the secondary of peaking transformer 99 determines the weld heat by controlling the point on the supply wave at which current passes to the load. The resistor 125 and inductive reactor 126 serve to shape the discharge pulse of firing capacitor 77 to give proper firing performance.

During the half cycle following that during which firing capacitor 108 was charged, a secondary of peaking transformer 99 supplies to the control grid circuit of valve 109 a pulsed positive firing potential. This occurs during the half cycle immediately following that during which a firing potential was supplied to the control grid 94 of valve 93. Consequently, valve 109 conducts during the half cycle immediately following that during which valve 93 conducted, the conduction of valve 109 serving to discharge firing capacitor 108 through the igniter circuit of electric discharge tube 103 previously described for the valve 93, firing capacitor 77, and electric discharge tube 91 arrangement.

It may readily be seen that the initial current through the welding transformer 105 during any welding operation is always conducted by discharge tube 91, that the final current through the welding transformer during any welding operation is always conducted by discharge tube 103, that the polarity of each pulsation of current through the welding transformer is opposite to that of the pulsation immediately preceding and following; that welding current flows during even numbers of half cycles only; and that the flow through the discharge tubes always starts at the same point on the voltage wave for any setting of the phase shifting selector 101.

During weld time, the current conducted by valve 67 energizes transformer 73, as previously explained, which serves to charge capacitor 78 through rectifier 79. The charge on capacitor 78 is so polarized as to establish at the grid 127 of valve 13 a potential negative with respect to cathode 128 of that valve. Before capacitor 78 had acquired a charge, the grid 127 was at such a potential with respect to cathode 128 that valve 13 conducted. The charge on capacitor 78 serves to cut off conduction of valve 13. The grid 129 of valve 13a being electrically connected to the plate 131 of valve 13 thereby becomes more positive and valve 13a conducts to charge the "hold" time capacitor 17 by the grid conduction of valve 14. At the end of the weld time when valve 67 is no longer conducting, the pulses of current which energize transformer 73, capacitor 78 discharges through the resistors 81 and 82; valve 13 again conducts and valve 13a ceases to conduct. The control grid 132 of valve 14 assumes a negative voltage due to the charge on the capacitor 17 when valve 13a stops conducting. Valve 14 will not conduct when subsequently the anode of this tube becomes positive with respect to the cathode thereof until such time as the charge on the capacitor 17 is dissipated. The dissipation of the charge on capacitor 17 is accomplished through the adjustable resistor combination 18 which determines the "hold" time in the welding cycle. When finally the "hold" time capacitor 17 is sufficiently discharged, the grid 132 of valve 14 is at a potential such as to render this valve conductive when subsequently the anode of this valve is positive with respect to the cathode thereof. Transformer 133 is polarized and connected so as to provide a synchronizing A. C. voltage in the valve 14 grid circuit. The rectifier bridge 7 provides the anode 134 of valve 14 with a pulsating D. C. voltage in order that the grid 132 may regain control over the conduction of this gas filled valve.

During the period in which valve 14 is non-conductive, the grid 135 of valve 22 is at a potential with respect to the cathode thereof to cause the valve 22 to conduct, charging capacitor 23 by grid conduction of valve 25. When valve 14 conducts, however, valve 22 does not conduct. Grid 136, now no longer in contact with the positive D. C. voltage through the valve 22, immediately becomes negative with respect to cathode 137 of this valve due to the charge on capacitor 23 and subsequent positive anode potentials cannot cause the tube to fire. Conduction of current through valve 25 ceases and relay coil 33 is thereby deenergized; contacts 35, 34 and 36 are opened, contacts 37 and 38 reclose, and the OFF time period is begun. Should the initiating switch 32 be held closed, or should that switch be reclosed, the cycle just described is repeated as soon as the charge on capacitor 23 is dissipated through adjustable resistor combination 24, permitting the grid 136 of valve 25 to assume a potential such that valve 25 conducts.

The cycle will not repeat when the initiating switch 32 is held closed, however, if the non-repeat switch 29 is closed. With this switch closed, the OFF time potentiometer 24 is partially shorted and the cathode circuit of valve 28 is completed, permitting the valve 28 to conduct after the charge on capacitor 31 has very rapidly dissipated. The conduction current of valve 28 passes from the positive D. C. supply through the relay coil 33 and initiating switch 32 to charge capacitor 23, the charge on the capacitor 23 causing the grid 136 of valve 25 to assume a potential such that valve 25 cannot conduct even though the initiating switch is held closed. When the initiating switch is opened, valve 28 ceases to conduct, the charge on capacitor 23 is dissipated, the charge on capacitor 31 is reestablished, and the valve 25 is in condition to conduct when the initiating switch is reclosed.

It may be seen that transformer 119 primary is in series with the thermal flow switch heaters 118, while the secondary of transformer 119 serves as the power supply to the filament of the relatively inexpensive rectifier tube 53. Should the thermal flow switch heaters burn out or short out, the secondary of transformer 119 is so disposed that the tube 53 will become inoperative due either to lack of filament power or filament burn-out. With tube 53 thusly inoperative, the weld timing capacitors 54 and 55 cannot be charged and the initiation of a welding period is not possible. The expensive power tubes are therefore protected from faults in the thermal flow switch heaters.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, a voltage supply, a capacitor, means for charging said last mentioned capacitor with one polarity from said voltage supply, means for impressing the voltages of said last mentioned capacitor and said last mentioned charging means also upon the control grid circuit of said electric valve, a pressure switch responsive to electrode pressure, means for discharging said last mentioned capacitor upon closure of said pressure switch to permit the "squeeze time" timing means to control the conduction of said electric valve, the voltage upon the grid thereof always being sufficiently negative to prevent conduction of said valve until after the closure of said pressure switch, and adjustable timing means controlling the number of conducting periods of said electric discharge tubes, thereby determining the "weld time" period.

2. In a system for sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, a voltage supply, a capacitor, means for charging said last mentioned capacitor with one polarity from said voltage supply, means for impressing the voltages of said last mentioned capacitor and said last mentioned charging means also upon the control grid circuit of said electric valve, a pressure switch responsive to electrode pressure, means for discharging said last mentioned capacitor upon closure of said pressure switch to permit the "squeeze time" timing means to control the conduction of said electric valve, the voltage upon the grid thereof always being sufficiently negative to prevent conduction of said valve until after the closure of said pressure switch, adjustable timing means controlling the number of conducting periods of said electric discharge tubes, thereby determining the "weld time" period, and adjustable timing means controlling the length of time after the cessation of load current flow during which pressure is applied to the work on the "hold time" period.

3. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, a voltage supply, a capacitor, means for charging said last mentioned capacitor with one polarity from said voltage supply, means for impressing the voltages of said last mentioned capacitor and said last mentioned charging means also upon the control grid circuit of said electric valve, a pressure switch responsive to electrode pressure, means for discharging said last mentioned capacitor upon closure of said pressure switch to permit the "squeeze time" timing means to control the conduction of said electric valve, the voltage upon the grid thereof always being sufficiently negative to prevent conduction of said valve until after the closure of said pressure switch, adjustable timing means controlling the number of conducting periods of said electric discharge tubes thereby determining the "weld time" period, adjustable timing means controlling the length of time after the cessation of load current flow during which pressure is applied to the work or the "hold time" period, and adjustable timing means controlling the period during which the welder is inoperative or the "off time" period.

4. In a system for the sequencing of welding operations, a pair of electric discharge tubes for controlling the passage of current to a welding load, an electric valve, adjustable timing means normally controlling the length of time after the initiation of the welding sequence until the conduction of said electric valve or the "squeeze time" period, a voltage supply, a capacitor, means for charging said capacitor with one polarity from said voltage supply, means for impressing the voltages of said capacitor and said charging means upon the control grid circuit of said electric valve, a pressure switch responsive to electrode pressure, means for discharging said capacitor upon closure of said pressure switch such that the "squeeze time" timing means controls the conduction of said electric valve, the voltage at the grid thereof always being sufficiently negative to permit conduction of said valve until after the closure of said pressure switch, adjustable timing means controlling the number of conducting periods of said electric discharge tubes thereby determining the "weld time" period, adjustable timing means controlling the length of time after the cessation of load current flow during which pressure is applied to the work or the "hold time" period, and adjustable timing means controlling the period during which the welder is inoperative or the "off time" period.

5. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, a voltage supply, means connecting said voltage supply also to the control grid of said electric valve, means including a pressure switch responsive to electrode pressure associated with said voltage supply, the potential of said control grid always remaining sufficiently negative to prevent the conduction of said electric valve until after the closure of said pressure switch, adjustable timing means controlling the number of conducting periods of said electric discharge tubes, thereby determining the "weld time" period, means energizing said last mentioned timing means, and thereby initiating the action thereof upon the conduction of said electric valve, adjustable timing means controlling the length of time after the cessation of load current flow during which pressure is applied to the work or the "hold time" period, means energizing said last mentioned timing means during the "weld time" period, means initiating the action of said last mentioned timing means immediately after the termination of said "weld time" period, adjustable timing means controlling the period during which a welding device is inoperative or the "off time" period, means energizing said "off time" timing means during the operative period of said "hold time" timing means, and means initiating the action of said "off time" timing means immediately after the termination of said "hold time" period.

6. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, a voltage supply, a capacitor, means for charging said last mentioned capacitor with one polarity from said voltage supply, means for impressing the voltages of said last mentioned capacitor and said last mentioned charging means also upon the control grid circuit of said electric valve, a pressure switch responsive to electrode pressure, means for discharging said last mentioned capacitor upon closure of said pressure switch to permit the "squeeze time" timing means to control the conduction of said electric valve, the voltage upon the grid thereof always being sufficiently negative to prevent conduction of said valve until after the closure of said pressure switch, adjustable timing means including a pair of capacitors, means for charging said pair of capacitors simultaneously upon the conduction of said electric valve, means effecting the conduction of said electric discharge tubes during a length of time dependent upon the difference in the rates of discharge of said pair of capacitors, adjustable timing means controlling the length of time after the cessation of load current flow during which pressure is applied to the work or the "hold time" period, and adjustable timing means controlling the period during which a welding device is inoperative or the "off time" period.

7. In a system for the sequencing of welding operations, a pair of electric discharge tubes for controlling the passage of current to a welding load, adjustable timing means controlling the length of time after the initiation of the welding sequence until the initiation of the "weld time" period, adjustable timing means controlling the "weld time" period including a pair of capacitors, means for charging said pair of capacitors simultaneously, means including a resistor paralleling one of said capacitors, means including a variable resistor paralleling the other of said capacitors to effect a difference between the rates of discharge of said capacitors, means including an electric valve controlling the conduction of said electric discharge tubes, means connecting said electric valve to said pair of capacitors so that the period of conduction thereof is dependent upon the difference between the rates of discharge of said pair of capacitors, adjustable timing means controlling the length of time after the cessation of load current flow during which pressure is applied to the work or the "hold time" period, and adjustable timing means controlling the period during which a welding device is inoperative or the "off time" period.

8. In a system for the sequencing of welding operations, a pair of electric discharge tubes for controlling the passage of current to a welding load, adjustable timing means controlling the length of time after the initiation of the welding sequence until the initiation of the "weld time" period, adjustable timing means controlling the "weld time" period including a pair of capacitors, means for charging said pair of capacitors simultaneously, means including a resistor paralleling one of said capacitors, means including a variable resistor paralleling the other of said capacitors to effect a difference between the rates of discharge of said capacitors, an electric valve, means connecting said electric valve to said pair of capacitors such that the period of conduction thereof is dependent upon the difference in the rates of discharge of said pair of capacitors, a second pair of capacitors, means charging one of said second pair of capacitors subsequent to the conduction of said last mentioned electric valve, means charging the other of said second pair of capacitors subsequent to the charging of the first of said second pair, means connecting one of said second pair of capacitors to the igniter of one of said electric discharge tubes, means connecting the other of said second pair of capacitors to the other of said electric discharge tubes, means discharging said second pair of capacitors through the igniters of said electric discharge tubes to initiate the conduction thereof, adjustable timing means controlling the length of time after the cessation of load current flow during which pressure is applied to the work or the "hold time" period, and adjustable timing means controlling the period during which a welding device is inoperative or the "off time" period.

9. In a system for the sequencing of welding operations, a pair of electric discharge tubes for controlling the passage of current to a welding load, adjustable timing means controlling the length of time after the initiation of the welding sequence until the initiation of the "weld time" period, adjustable timing means controlling the period during which the electric discharge tubes can conduct or the "weld time" period, a pair of capacitors, means responsive to the action of said last mentioned timing means for charging one of said pair of capacitors, means for charging the other of said pair of capacitors subsequent to the charging of the first pair, means for discharging said capacitors through the igniters of said electric discharge tubes to effect conduction thereof, adjustable timing means controlling the length of time after the cessation of load current flow during which pressure is applied to the work or the "hold time" period, and adjustable timing means controlling the period during which a welding device is inoperative or the "off time" period.

10. In a system for the sequencing of welding operations, a pair of electric discharge tubes for controlling the passage of current to a welding load, adjustable timing means controlling the length of time after the initiation of the welding sequence until the initiation of the "weld time" period, pressure responsive means, means nullifying the effect of said timing means until after the operation of said pressure responsive means, adjustable timing means controlling the "weld time" period including a pair of capacitors, means for charging said pair of capacitors simultaneously, means including a resistor paralleling one of said capacitors, means including a variable resistor paralleling the other of said pair of capacitors to effect a difference between the rates of discharge of said capacitors, means including an electric valve controlling the conduction of said electric discharge tubes, means connecting said last mentioned electric valve to said pair of capacitors such that the period of conduction thereof is dependent upon the difference in the rates of discharge of said pair of capacitors, adjustable timing means controlling the length of time after the cessation of load current flow during which pressure is applied to the work or the "hold time" period, and adjustable timing means controlling the period during which a welding device is inoperative or the "off time" period.

11. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, adjustable timing means controlling the "weld time" period including a pair of capacitors, means for charging said pair of capacitors simultaneously, means including a resistor paralleling one of said capacitors, means including a variable resistor paralleling the other of said pair of capacitors to effect a difference between the rates of discharge of said capacitors, means including an electric valve controlling the conduction of said electric discharge tubes, means connecting said last mentioned electric valve to said pair of capacitors such that the period of conduction thereof is dependent upon the difference in the rates of discharge of said pair of capacitors, adjustable timing means controlling the length of time after the cessation of load current flow during which pressure is applied to the work or the "hold time" period, and adjustable timing means controlling the period during which a welding device is inoperative or the "off time" period.

12. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, adjustable timing means controlling the "weld time" period including a pair of capacitors, means for charging said pair of capacitors simultaneously, means including a resistor paralleling one of said capacitors, means including a variable resistor paralleling the other of said pair of capacitors to effect a difference between the rates of discharge of said capacitors, means including an electric valve controlling the conduction of said electric discharge tubes, means connecting said last mentioned electric valve to said pair of capacitors such that the period of conduction thereof is dependent upon the difference in the rates of discharge of said pair of capacitors, a capacitor, means responsive to the conduction of said last mentioned electric valve to charge said last mentioned capacitor, a second capacitor, means charging said second capacitor subsequent to the charging of said last mentioned capacitor, means for discharging said two last mentioned capacitors through the igniters of the said electric discharge tubes to initiate the conduction thereof, adjustable timing means controlling the length of time after the cessation of load current flow during which pressure is applied to the work or the "hold time" period, and adjustable timing means controlling the period during which a welding device is inoperative or the "off time" period.

13. In a system for the sequencing of welding operations, a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, pressure responsive means, means nullifying the effect of said timing means until after the operation of said pressure responsive means, adjustable timing means controlling the "weld time" period including a pair of capacitors, means for charging said pair of capacitors simultaneously, means including a resistor paralleling one of said capacitors, means including a variable resistor paralleling the other of said pair of capacitors to effect a difference between the rates of discharge of said capacitors, means including an electric valve controlling the conduction of said electric discharge tubes, means connecting said last mentioned electric valve to said pair of capacitors such that the period of conduction thereof is dependent upon the difference in the rates of discharge of said pair of capacitors, adjustable timing means controlling the length of time after the cessation of load current flow during which pressure is applied to the work or the "hold time" period, and adjustable timing means controlling the period during which a welding device is inoperative or the "off time" period.

14. In a system for the sequencing of welding operations a pair of electric discharge tubes for controlling the passage of current to a welding load, a capacitor, means for charging said capacitor, an electric valve, means connecting said capacitor to the control grid of said electric valve, a valve solenoid, means energizing said valve solenoid to apply pressure to the welding electrodes, means for effectively disconnecting said capacitor from said charging means to initiate the "squeeze time" period, means including a variable resistor bridging said capacitor to effect an adjustable discharge time for said capacitor thereby determining the "squeeze time" period, adjustable timing means controlling the "weld time" period including a pair of capacitors, means for charging said pair of capacitors simultaneously, means including a resistor paralleling one of said capacitors, means including a variable resistor paralleling the other of said pair of capacitors to effect a difference between the rates of discharge of said capacitors, means including an electric valve controlling the conduction of said electric discharge tubes, means connecting said last mentioned electric valve to said pair of capacitors such that the period of conduction thereof is dependent upon the difference in the rates of discharge of said pair of capacitors, a normally conducting electric valve, adjustable timing means comprising a capacitor and resistor to control the period after the cessation of load current flow during which electrode pressure is applied to the work, an electric valve, means connecting said last mentioned adjustable timing means to the control grid of said last mentioned electric valve to control the conduction thereof, means to interrupt the conduction of said normally conducting electric valve, means to energize said last mentioned adjustable timing means upon the interruption of said normally conducting electric valve, means to initiate the timed period controlled by said last mentioned adjustable timing means, and adjustable timing means controlling the period during which a welding device is inoperative or the "off time" period.

15. In a system for the sequencing of welding operations, a pair of electric discharge tubes for controlling the passage of current to a welding load, an initiating switch, a solenoid energized upon closure of said switch, adjustable timing means controlling the length of time after the initiation of the welding sequence until the conduction of said electric discharge tubes or the "squeeze time" period, said timing means comprising a capacitor charged from a source and effectively disconnected from said source upon energization of said solenoid, adjustable timing means controlling the period during which said electric discharge tubes can conduct, said last mentioned adjustable timing means comprising a pair of capacitors and means for discharging one of said pair of capacitors at a different rate than that at which the other of said pair is discharged, a normally conducting electric valve, adjustable timing means comprising a capacitor and resistor to control the length of the period after the cessation of load current flow during which electrode pressure is applied to the work, an electric valve, means connecting said last mentioned adjustable timing means to the control grid of said last mentioned electric valve to control the conduction thereof, means to interrupt the conduction of said normally conducting electric valve, means to energize said last mentioned adjustable timing means upon the interruption of said normally conducting electric valve, means to initiate the timed period controlled by said last mentioned adjustable timing means, and adjustable timing means controlling the period during which a welding device is inoperative or the "off time" period.

16. In a system for the sequencing of welding operations, a pair of electric discharge tubes for controlling the passage of current to a welding load, an initiating switch, a solenoid energized upon closure of said switch, adjustable timing means controlling the length of time after the initiation of the welding sequence until the conduction of said electric discharge or the "squeeze time" period, said timing means comprising a capacitor charged from a source and effectively disconnected from said source upon energization of said solenoid, adjustable timing means controlling the period during which said electric discharge tubes can conduct said last mentioned adjustable timing means comprising a pair of capacitors and means for discharging one of said pair of capacitors at a different rate than that at which the other of said pair is discharged, adjustable timing means controlling the length of time after the cessation of load current flow during which pressure is applied to the work or the "hold time" period, adjustable timing means comprising a capacitor and resistor controlling the period during which the welder is inoperative or the "off time," an electric valve, means connecting said last mentioned adjustable timing means in the control grid circuit of said electric valve to control the conduction thereof, a normally conducting electric valve, means interrupting the conduction of said normally conducting electric valve, means energizing said last mentioned timing means during the period in which said normally conducting electric valve is cut-off, means initiating the timed period determined by said last mentioned adjustable timing means or the "off time" period.

17. In a system for the sequencing of welding operations, a voltage supply, a pair of electric discharge tubes for controlling the passage of current to a welding load, means for adjustably determining the length of time after the initiation of the welding sequence until the conduction of said electric discharge tubes, a first electric valve responsive to said last mentioned means, adjustable timing means comprising a pair of capacitors, means for charging said pair of capacitors simultaneously upon conduction of said electric valve, means for discharging each of said pair of capacitors at different rates, a second electric valve having at least an anode and cathode and a control electrode, means connecting the control electrode of said second electric valve to one of said pair of capacitors and means connecting the cathode of said second electric valve to the other of said pair of capacitors whereby said second electric valve is rendered conductive only during a period dependent upon the voltage difference between said capacitors, a transformer having a primary winding and a plurality of secondary windings, means connecting the primary of said transformer in circuit with said second electric valve, means connecting one of said secondary windings to means for rendering said electric discharge tubes conducting during a weld time period determined by the period of conduction of said second electric valve, a normally conducting third electric valve, means for preventing the conduction of said third electric valve during conduction of said second electric valve including another secondary winding of said transformer, a fourth electric valve having a pair of principal electrodes and a control electrode, means connecting the control electrode of said fourth electric valve to the anode of said third electric valve whereby said fourth electric valve is rendered conducting upon the interruption of conduction of said third electric valve, a normally conducting fifth electric valve having a pair of principal electrodes and a control electrode, means electrically connecting the cathode of said fifth electric valve to a potential lower than that of the cathode of said fourth electric valve, a third capacitor in the control electrode circuit of said fifth electric valve, means for connecting said third capacitor to the cathode of said fourth electric valve whereby said capacitor is charged through control electrode conduction of said fifth electric valve by conduction of said fourth electric valve, and an adjustable resistor in parallel with said third capacitor, said fourth electric valve returning to non-conducting condition upon reinitiation of conduction of said third electric valve at the termination of the "weld time" period whereby said fifth electric valve is rendered non-conducting for a period determined by the rate at which said last mentioned capacitor discharges through said adjustable resistor to determine the "hold time" period.

18. In a system for the sequencing of welding operations, a voltage supply, a pair of electric discharge tubes for controlling the passage of current to a welding load, means for adjustably determining the length of time after the initiation of the welding sequence until the conduction of said electric discharge tubes, a first electric valve responsive to said last mentioned means, adjustable timing means comprising a pair of capacitors, means for charging said pair of capacitors simultaneously upon conduction of said electric valve, means for discharging each of said pair of capacitors at different rates, a second electric valve having at least an anode and cathode and a control electrode, means connecting the control electrode of said second electric valve to one of said pair of capacitors and means connecting the cathode of said second electric valve to the other of said pair of capacitors whereby said second electric valve is rendered conductive only during a period dependent upon the voltage difference between said capacitors, a transformer having a primary winding and a plurality of secondary windings, means connecting the primary of said transformer in circuit with said second electric valve, means connecting one of said secondary windings to means for rendering said electric discharge tubes conducting during a weld time period determined by the period of conduction of said second electric valve, a normally conducting third electric valve, means for preventing the conduction of said third electric valve during conduction of said second electric valve including another secondary winding of said transformer, a fourth electric valve having a pair of principal electrodes and a control electrode, means connecting the control electrode of said fourth electric valve to the anode of said third electric valve whereby said fourth electric valve is rendered conducting upon the interruption of conduction of said third electric valve, a normally conducting fifth electric valve having a pair of principal electrodes and a control electrode, means electrically connecting the cathode of said fifth electric valve to a potential lower than that of the cathode of said fourth electric valve, a third capacitor in the control electrode circuit of said fifth electric valve, means for connecting said third capacitor to the cathode of said fourth electric valve whereby said capacitor is charged through control electrode conduction of said fifth electric valve by conduction of said fourth electric valve, and an adjustable resistor in parallel with said third capacitor, said fourth electric valve returning to non-conducting condition upon reinitiation of conduction of said third electric valve at the termination of the "weld time" period whereby said fifth electric valve is rendered non-conducting for a period determined by the rate at which said last mentioned capacitor discharges through said adjustable resistor to determine the "hold time" period, a normally non-conducting sixth electric valve having a pair of principal electrodes and a control electrode, means connecting the control electrode of said sixth electric valve to the anode of said fifth electric valve whereby said control electrode of said sixth electric valve acquires a higher potential during the period of non-conduction of said fifth electric valve to render said sixth electric valve conductive, a seventh electric valve having a pair of principal electrodes and a control electrode, a valve solenoid in series with said seventh electric valve, a fourth capacitor in the control grid circuit of said seventh electric valve and connected to the cathode of said sixth electric valve, means connecting the cathode of said seventh electric valve to a potential lower than that of the cathode of said sixth electric valve, and an adjustable resistor in parallel with said fourth capacitor, said fourth capacitor charging upon conduction of said sixth electric valve through control electrode conduction of said seventh electric valve, and discharging upon the termination of the conducting period of said sixth electric valve through the adjustable resistor in parallel therewith to determine the "off time" period, said seventh electric valve being cut off during the discharge of said fourth capacitor.

HARRIS I. STANBACK.
ERNEST G. ANGER.

REFERENCES CITED

The following references are of record in the file of this patent:

UNITED STATES PATENTS

| Number | Name | Date |
| --- | --- | --- |
| 2,295,601 | Overbeck | Sept. 15, 1942 |
| 2,298,570 | Leathers | Oct. 13, 1942 |
| 2,309,280 | Stansbury | Jan. 26, 1943 |
| 2,333,363 | Callom | Nov. 2, 1943 |
| 2,390,981 | Bivens | Dec. 18, 1945 |
| 2,459,041 | Mitsch | Jan. 11, 1949 |
| 2,476,882 | Lexa | July 19, 1949 |